US012418179B2

(12) United States Patent
Manikfan et al.

(10) Patent No.: US 12,418,179 B2
(45) Date of Patent: Sep. 16, 2025

(54) SYSTEM AND APPARATUS FOR THE CONTROL OF BATTERY ENERGY STORAGE SYSTEMS

(71) Applicant: Honeywell International Inc., Charlotte, NC (US)

(72) Inventors: Sameer D. Manikfan, Hyderabad (IN); Santhosh Mathew, Bengaluru (IN); Dinesh Kumar Kn, Bengaluru (IN); Andrew J. Trenchard, Plymouth (GB)

(73) Assignee: Honeywell International Inc., Charlotte, NC (US)

( * ) Notice: Subject to any disclaimer, the term of this patent is extended or adjusted under 35 U.S.C. 154(b) by 524 days.

(21) Appl. No.: 17/831,221

(22) Filed: Jun. 2, 2022

(65) Prior Publication Data
US 2023/0396067 A1   Dec. 7, 2023

(51) Int. Cl.
*H02J 3/32*   (2006.01)
*H02J 7/00*   (2006.01)

(52) U.S. Cl.
CPC .............. *H02J 3/32* (2013.01); *H02J 7/0047* (2013.01); *H02J 7/0068* (2013.01)

(58) Field of Classification Search
CPC .... H02J 13/00022; H02J 2310/10; H02J 3/32; H02J 3/381; H02J 7/0047; H02J 7/0068; H02J 7/00712; H02J 7/02
USPC ........................................................ 700/287
See application file for complete search history.

(56) References Cited

U.S. PATENT DOCUMENTS

| | | | |
|---|---|---|---|
| 10,700,521 B2 | 6/2020 | Shim et al. | |
| 11,532,948 B2 | 12/2022 | Sato et al. | |
| 11,658,486 B2 | 5/2023 | Newman et al. | |
| 2012/0101639 A1 | 4/2012 | Carralero et al. | |
| 2014/0292259 A1* | 10/2014 | Kim | H02J 7/00 320/107 |
| 2016/0233699 A1* | 8/2016 | Kang | H02J 7/04 |
| 2017/0126032 A1* | 5/2017 | Beaston | H02J 7/0016 |
| 2020/0153274 A1* | 5/2020 | Münz | H02J 13/00007 |
| 2020/0195011 A1* | 6/2020 | de Callafon | H02J 3/32 |
| 2020/0295567 A1 | 9/2020 | Won | |
| 2020/0403419 A1 | 12/2020 | Yokoyama et al. | |
| 2021/0221247 A1 | 7/2021 | Daniel et al. | |
| 2021/0351590 A1* | 11/2021 | de Callafon | H02J 13/00002 |
| 2021/0359522 A1* | 11/2021 | Newman | H02J 7/0047 |
| 2022/0131381 A1* | 4/2022 | Sergott | H02J 3/48 |
| 2022/0131388 A1* | 4/2022 | Sergott | H02J 3/32 |

(Continued)

OTHER PUBLICATIONS

Extended Search Report for EP23173543.2 dated Nov. 7, 2023.

*Primary Examiner* — Chun Cao
(74) *Attorney, Agent, or Firm* — Paschall & Associates, LLC; James C. Paschall; Anthony Miologos

(57) ABSTRACT

A battery energy storage system is disclosed that receives energy from an electrical grid and supplies electrical energy to one or more microgrids. The battery energy storage system comprises a power conversion system arranged to charge a battery with the energy from the electrical grid and discharge the battery to supply electrical energy to the one or more microgrids. An energy control system controller communicatively coupled to the power conversion system manages the energy drawn from the electrical grid to charge the battery and to manage the energy discharged from the battery to supply electrical energy to the one or more microgrids.

17 Claims, 4 Drawing Sheets

(56) References Cited

U.S. PATENT DOCUMENTS

| | | |
|---|---|---|
| 2022/0314837 A1 | 10/2022 | Gupta |
| 2022/0360105 A1* | 11/2022 | Beaston .................... H02J 3/32 |
| 2023/0294544 A1* | 9/2023 | Sowa ...................... B60L 53/66 |
| | | 700/291 |

* cited by examiner

SYSTEM AND APPARATUS FOR THE CONTROL OF BATTERY ENERGY STORAGE SYSTEMS

TECHNICAL FIELD

This disclosure is generally directed to energy storage systems. More specifically, it relates to a system and apparatus for the control of battery energy storage systems.

BACKGROUND

Currently, most electric power is generated by large, centralized power plants, such as nuclear powerplants, hydroelectric plants, and fossil fuel powered plants. These large facilities frequently generate power using non-renewable sources of energy, such as coal or gas. Such power plants commonly have good economies of scale however due to various economic and operational reasons may not provide all of the power required to service the loads of the electrical grid services by the centralized power plant. For example, such as increased load at certain times of the day, aging outside plant and environmental impacts provided by seasonal effects. Energy storage systems having stored generated power may be connected at a power plant, substation, transmission line or at a customer site to selectively use stored energy to supplement or provide all the power required by the grid, thereby preventing service interruptions.

Energy storage systems employ chemical energy storage batteries that chemically store energy such as for example a lithium ion (LiON) batteries, lead acid batteries (Pb), or sodium-sulfur (NAS) batteries. However, a conventional energy storage system may not be able to manage the power requirements of an area such as adjacent microgrids or buildings in an integrated manner. For example, a microgrid or building directly managed by an energy storage system with the power state of an adjacent building or microgrid powered by another energy storage system. This becomes further problematic when the adjacent microgrids or buildings have different peak control timings, different power generation plans and are required to control different power demands and supply states.

The present disclosure describes an energy storage system that ensures the safe and reliable operation of an energy storage system while simultaneously delivering multiple use cases for managing the power requirements of adjacent areas of a power grid serviced by one or more energy storage systems.

SUMMARY

This disclosure relates to a system and apparatus for the control of battery energy storage systems.

In a first embodiment a battery energy storage system is disclosed that receives energy from an electrical grid and supplies electrical energy to one or more microgrids. The battery energy storage system comprises a power conversion system arranged to charge a battery with the energy from the electrical grid and discharge the battery to supply electrical energy to the one or more microgrids. An energy control system controller communicatively coupled to the power conversion system manages the energy drawn from the electrical grid to charge the battery and to manage the energy discharged from the battery to supply electrical energy to the one or more microgrids.

In a second embodiment an apparatus is disclosed for receiving energy from an electrical grid and for suppling electrical energy to one or more microgrids. The apparatus comprising, an energy control system processor and an energy control system memory coupled to the energy control system processor. A power conversion system is arranged to charge a battery with the energy from the electrical grid and discharge the battery to supply electrical energy to the one or more microgrids. An energy control system controller stored in the energy control system memory is executed by the energy control system processor that manages the energy drawn from the electrical grid to charge the battery and to manage the energy discharged from the battery to supply electrical energy to the one or more microgrids.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
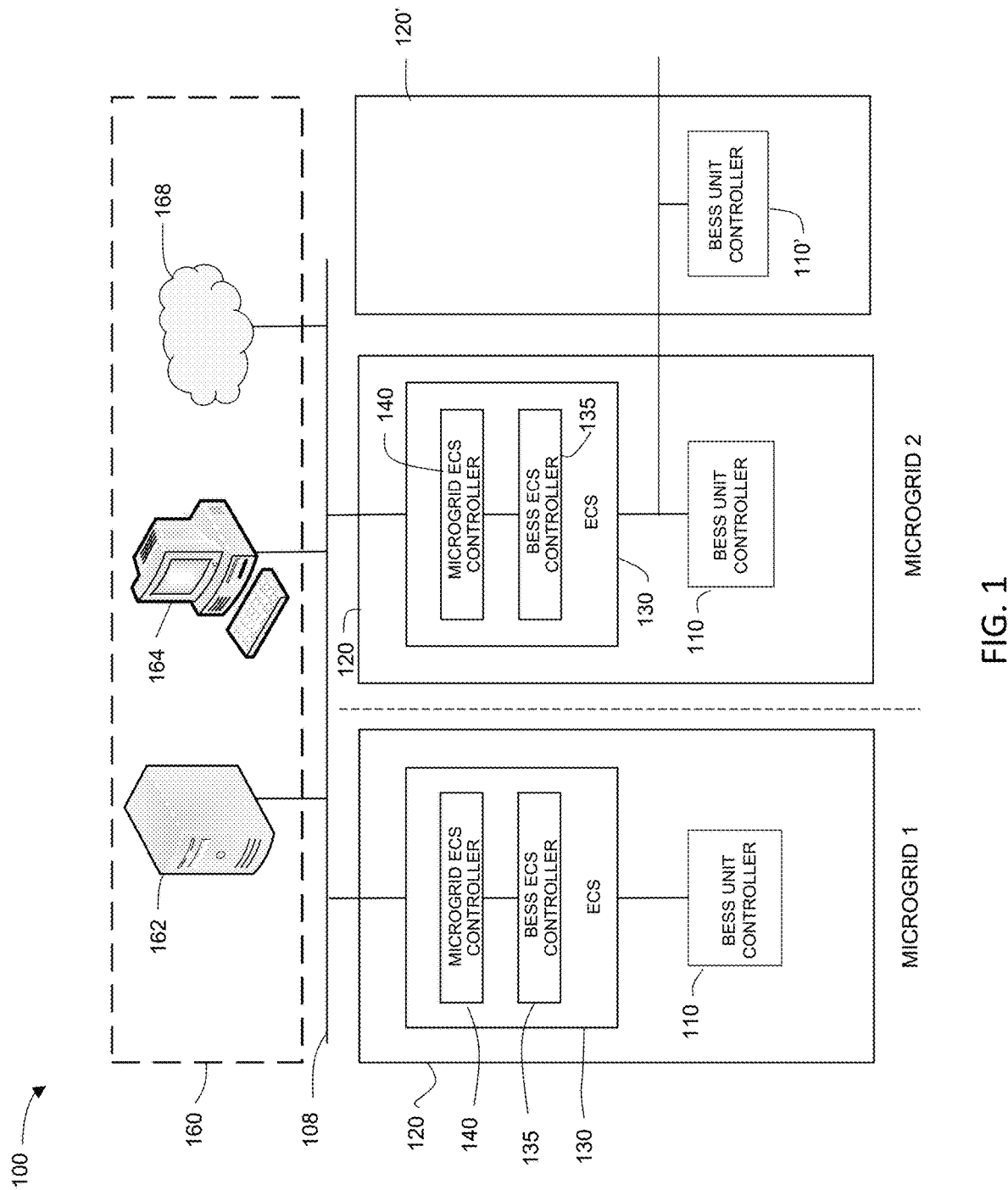
FIG. 1 is a diagram schematically illustrating the multi-level control system for the battery energy storage system according to an exemplary embodiment of the present disclosure.
Figure 2:
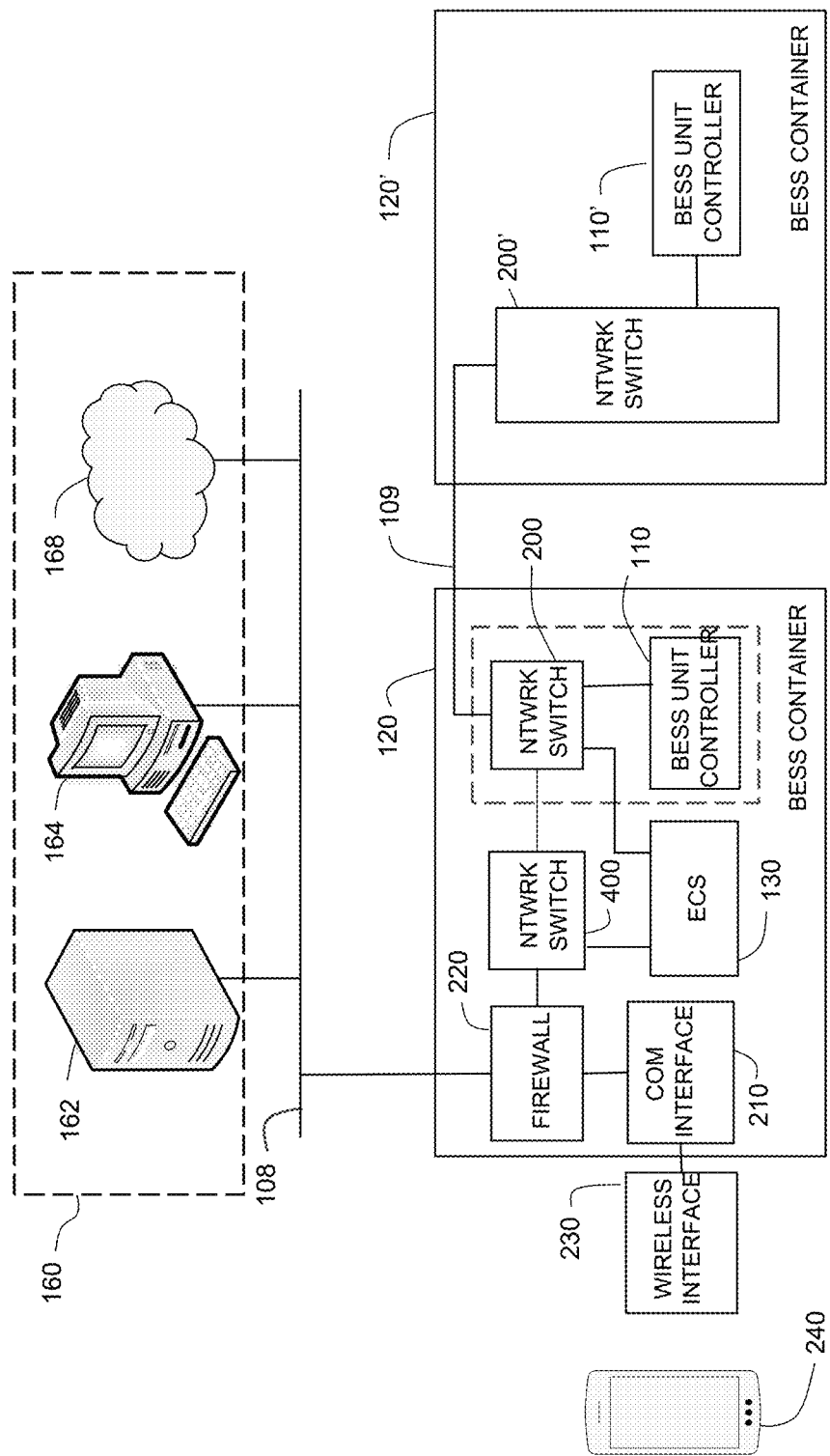
FIG. 2 is diagram schematically illustrating the communication networks and features of the battery energy storage system according to an exemplary embodiment of the present disclosure.

A multi-level control system is disclosed for controlling a battery energy storage system (BESS). As illustrated in FIGS. 1 and 2, the BESS is comprised of a multi-level control system 100 consisting of four hierarchical levels. At the first level, a BESS unit controller 110 is located in a BESS container 120. The BESS unit controller 110 is used to control the functions of a BESS container 120 and its power conversion assets. Each BESS container 120 is organized as a self-contained package that may at least include a power conversion system, a battery system, a heating ventilation, and air conditioning (HVAC) system, fire protection systems and components and sensors required to monitor the BESS container 120. Each BESS container 120 can be used to power stand-alone deployments of the BESS 100 such as for example, a building or a business enterprise or microgrid deployments where a single BESS container 120 or multiple BESS containers 120 can provide power to a neighborhood of homes or to a business district.

At the second level an energy control system (ECS) 130 is communicatively coupled to one or more BESS unit controllers 110, 110'. The ECS 130 including a BESS ECS controller 135 that controls the operation of one or more BESS containers 120. The ECS 130 is comprised of a BESS ECS controller 135 and a microgrid ECS (MECS) controller 140. The ECS 130 may be connected to stand-alone BESS container 120 deployments or multiple BESS container 120 deployments or to grid connected multi-container BESS deployments. For example, in FIG. 1, the ECS 130 is shown connected to both BESS unit controller 110, as well as BESS unit controller 110' of BESS container 120'.

The MECS controller 140 comprises the third level of the BESS control system 100. The MECS controller 140 is communicatively coupled to the BESS ECS controller 135 and manages alternate power generation assets such as for example, solar, wind, hydroelectric power that may be connected and available on the grid for use by the BESS container 120. The BESS MECS controller 140 is arranged to provide the alternate power capabilities to either a stand-alone BESS container 120 deployment or to multiple microgrid connected BESS container deployments.

Level 4 of the BESS control system 100 includes a virtual power plant (VPP) 160. The VPP 160 is comprised of distributed small and medium-scale power generating units, loads and energy storage systems, that when aggregated and coordinated using software, performs functions equivalent to a centralized physical power plant. A software operating program executing on, for example a server 162, functions as a controller that controls the VPP 160. The VPP 160 further includes an operator station 164 and an interface to the cloud 168. The server 162 may be any device that provides resources, data, services or software programs to other processing devices or clients over a network. The operator station 164 may be any computing device that provides functions for power plant operations and monitoring including display of graphics such as diagrams, systems, BESS container 120 deployments and data to a user or operator. The operator station 164 may also receive input from the user or operator to adjust or enter configurable parameters for the BESS unit controller 120, BESS ECS controller 135 and the MECS controller 140. The cloud 168 may be any computing device or technology that delivers services through the internet, including, information, data storage, servers, access to databases, networking, and software. The VPP 160 can control multiple BESS containers 120 connected to the VPP 160 through a communication network 108. The VPP 160 as shown in FIG. 1 controls BESS containers 120, 120' in multigrid deployments such as the microgrid 1 and microgrid 2 illustrated in FIG. 1.

With reference to FIG. 2, the communication features of the BESS unit container 120 are illustrated. Each BESS container 120 further includes communication interfaces that operate using for example an Ethernet communication protocol to communicate between the various components of BESS container 120 and to other BESS containers communicatively coupled to each other in multi-container deployments as for example, between BESS container 120 and 120'. The BESS unit container 120 connects to the VPP 160 and to server 162, operator station 164 and cloud 168 via network switch 400, firewall 220, and network 108. Communication between the BESS container 120 and VPP 160 is based on DNP3 protocol as used in supervisory control and data acquisition (SCADA) and remote monitoring systems. Network switching devices 200 contained in the BESS container 120 distribute control and data signals between the components of the BESS container 120 and to other interconnected BESS containers, such as for example BESS container 120'. For example, network switch 200' located in BESS container 120' may receive control and data signal from the ECS 130 contained in BESS container 120. The network switch 200 distributing the control and data signals from ECS 130 to BESS unit controller 110' via network switch 200' using network 109. The BESS unit container 120 may also include a communication interface 210 that may connect to a wireless interface 230 allowing communication with the BESS unit controller 110 using a handheld mobile device 240. The handheld mobile device 240 can be used to configure operating parameters of the BESS container 120, and/or retrieve operating data, fault conditions and/or alarms and warnings from the BESS unit controller 110. The BESS container 120 may also include other forms of communication interfaces such as for example, serial digital and analog I/O communication interfaces, which allow the BESS unit controller 110 to communicate and control BESS container 120 subsystems, sensors and components that will be explained in FIG. 3.

The BESS unit controller 110 is tasked to provide for the safe and reliable operation of a BESS container 120. The BESS unit controller 110 monitors the operation of a BESS container 120 preventing operations during fault conditions, shutting down a faulty subsystem and/or sending notifications and alarms to operator station 164 or to mobile device 240. Alarms may be sent using different priority levels if a component, sensor, or subsystem of the BESS unit container 120 fails or becomes faulty. The BESS unit controller 110 interfaces with all the subsystems within a container such as a power conversion system, battery system, HVAC subsystems, fire protection systems etc. The major components of the BESS unit container 120 includes the BESS unit controller 110, battery racks 305 housed within the BESS container 120, a power container 310 housed on a separate transportable skid, and the ECS 130.

Figure 3:
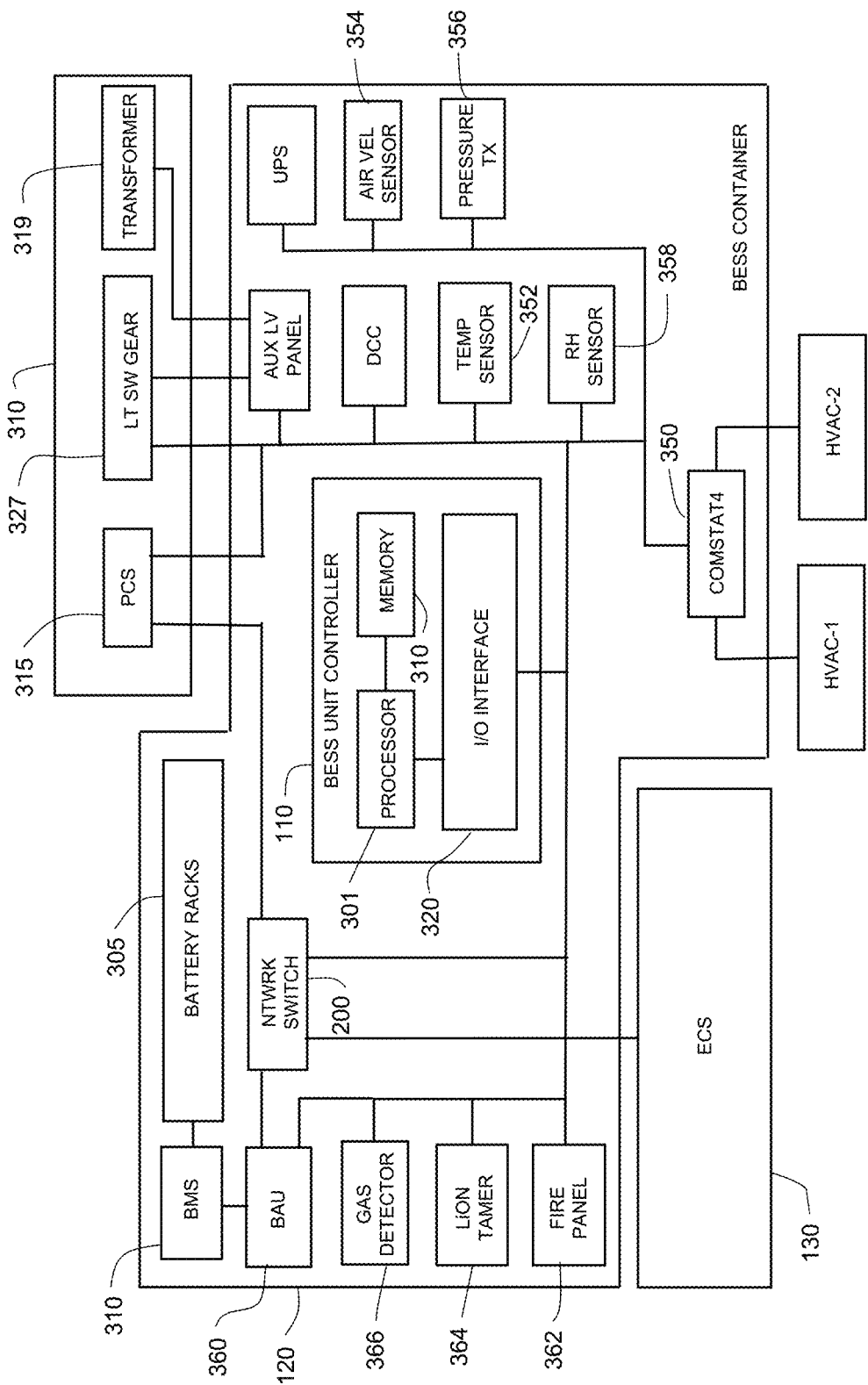
FIG. 3 is diagram schematically illustrating the battery energy storage system container, according to an exemplary embodiment of the present disclosure.

As shown in FIG. 3, the BESS unit controller 110 is comprised of at least one processor 301, at least one memory device 310, and at least one I/O interface 320. The processor 301 executes instructions that may be loaded into memory 310. The processor 301 may include any suitable number(s) and type(s) of processing or other devices in any suitable arrangement. Example types of processing devices include microprocessors, microcontrollers, digital signal processors, field programmable gate arrays, application specific integrated circuits, and discreet circuitry. The processor 301 executes the various programs that operates the various operating modes, states, and safety systems of the BESS container 120.

The memory 310 represents any structure(s) capable of storing and facilitating retrieval of information (such as data, program code, and/or other suitable information on a temporary or permanent basis). The memory 310 may represent a random access memory or any other suitable volatile or non-volatile storage device(s). The memory may also include one or more components or devices supporting longer-term storage of data, such as a ready only memory, hard drive, flash memory, or optical disc.

The I/O interface supports communications with the other systems or devices contained in the BESS container 120. For example, the communications interface 320 could include I/O modules and a network interface card that facilitates communications between the BESS unit controller 110 and the subsystems and sensors of the BESS container 120 as well to levels 2-4 of the BESS control system 100. The I/O unit 320 may support communications through any suitable physical wired communication link or bus. For example, the I/O interface 320 may include an I/O module that can interface control signals to connected HVAC systems HVAC-1 and HVAC-2 through a comstat4 HVAC controller 350 using a serial digital output. The I/O interface 320 may also include an analog module that can receive 4-20 mAh current loop signals from the various analog sensors located in the BESS container 120, such as for example, temperature sensor 352, air velocity sensor 354, pressure sensor and transmitter 356 and the relative humidity (RH) sensor 358. The I/O interface 320 also includes an Ethernet interface for bidirectional communication of control signals and data between a battery administration unit (BAU) 360, the ECS 130 and the various fire safety devises such as the fire detection panel 362 and LiON-tamer 364 and gas detector 366, that detects hydrogen gas that may be generated by lithium batteries as they degrade.

As illustrated in FIG. 3, the BESS container 120 includes battery racks 305 that are organized as battery modules that are electrically interconnected in series and also in parallel. The battery modules are further organized as cells that are also electrically interconnected in series and also in parallel. The multiple battery modules form a battery rack and multiple battery racks 305 are stacked within the BESS container 120. Charging and discharging of batteries in the battery racks 305 take into account the state of charge (SOC) of the battery modules and ensures that charging does not cause increased power dissipation and heating of the individual cells. Controlling charge profile based on SOC is typically a function provided by a battery management system (BMS) 310 associated with battery racks 305.

Each BESS container 120 is also connected to a power container 310 communicatively coupled to the BESS container 120. The power container 310 typically includes a bidirectional power conversion system (PCS) 315 and its associated components. The PCS 315 converts an AC voltage supplied by the grid, to DC voltage to charge the battery racks 305 or converts the DC power provided by the battery racks 305 into an AC voltage providing electrical power to a connected building, dwellings or to a microgrid. The power container 310 may also include low tension (LT) switch gear 327 and transformer 319 to provide electrical power to low tension or low voltage electrical networks.

The BESS unit controller 110 is further operatively connected to the BESS ECS controller 135 The BESS ECS controller 135 acts as a supervisory controller to one or more BESS unit controllers 110. As shown in FIGS. 1 and 2 an ECS 130 can control one or more BESS containers using the control network 109. The BESS unit controller 110 of each BESS container 120 gathers the operating parameters of a connected BESS unit 120 and sends the data to its supervising BESS ECS controller 135 for control of the charging and discharging requirements of the BESS container(s) 120. For example, BESS ECS controller 135 computes the power reference for each PCS 315 attached to one or more BESS container 120, taking into account the current operational state of a BESS container 120, such as alarms related to failure of subsystems or faults and diagnostics data of critical subsystems, such as the battery racks 305, PCS 315 and HVAC.

When multiple BESS containers 120 and their power containers 310 are used at any site to provide electrical power at a stand-alone site or microgrid, the BESS ECS controller 135 determines the total charging power or discharging power that should be provided to the deployment and distributes the charging or discharging power requirements to the connected multiple BESS unit controllers 110. For example, the BESS ECS controller 135 computes a power reference for the different PCS 315 units, considering the power capacity of each PCS 315 and the power and energy capacity of the BESS container 120. Power and energy capacity of the BESS container 120 is determined by the number of battery racks 305 in operation. When there are multiple BESS containers 120 deployed at stand-alone site, or at a microgrid site, and the multiple BESS containers 120 are connected to a single PCS 315, the deployment however having a capability of more than a single PCSs 315, then the BESS ECS controller 135 computes power reference for all the PCSs 315 that are available to be connected. The BESS ECS controller 135 communicates the state of the plurality of BESS containers 120 to the next level in the BESS control hierarchy, the MECS controller 140. The BESS ECS controller 135 also communicates the available power reference for a PCS 315 to the BESS unit controller 135, associated and connected to a BESS container 120.

In installations having multiple BESS containers 120 the balancing state of the battery racks 305 for one BESS container 120 with the battery racks of another BESS container is not taken in account by either the BMS 310 of each battery racks 305 or the battery administration unit 360 of the BESS container 120. In such multiple BESS container 120 installations the BESS ECS controller 135 manages each battery administration unit (BAU) 360 of a BESS container 120 through its respective BESS unit controller 110, via network switch 200. The ECS controller 135 provides a state of charge (SOC) balancing through the BAU 360 to the BMS 310 of each of the battery racks 305 of the multiple connected BESS containers 120.

Additionally, the BESS ECS controller 135 is arranged to consider the microgrid loads that the BESS container 120 needs to power and manages the available power containers 310 to draw sufficient power from the battery racks 305 of each BESS container 120 so as not to over-discharge anyone of the battery racks 305. When multiple BESS containers 120 and PCS 315 are used at any deployment site, the BESS ECS controller 135 is further arranged to determine the total charging power or discharging power for the multiple BESS containers 120. The BESS ECS controller 135 controls the distribution of the charging power to the multiple BAU units 360 and their associated battery racks 305 to the multiple BESS power containers 310.

Figure 4:
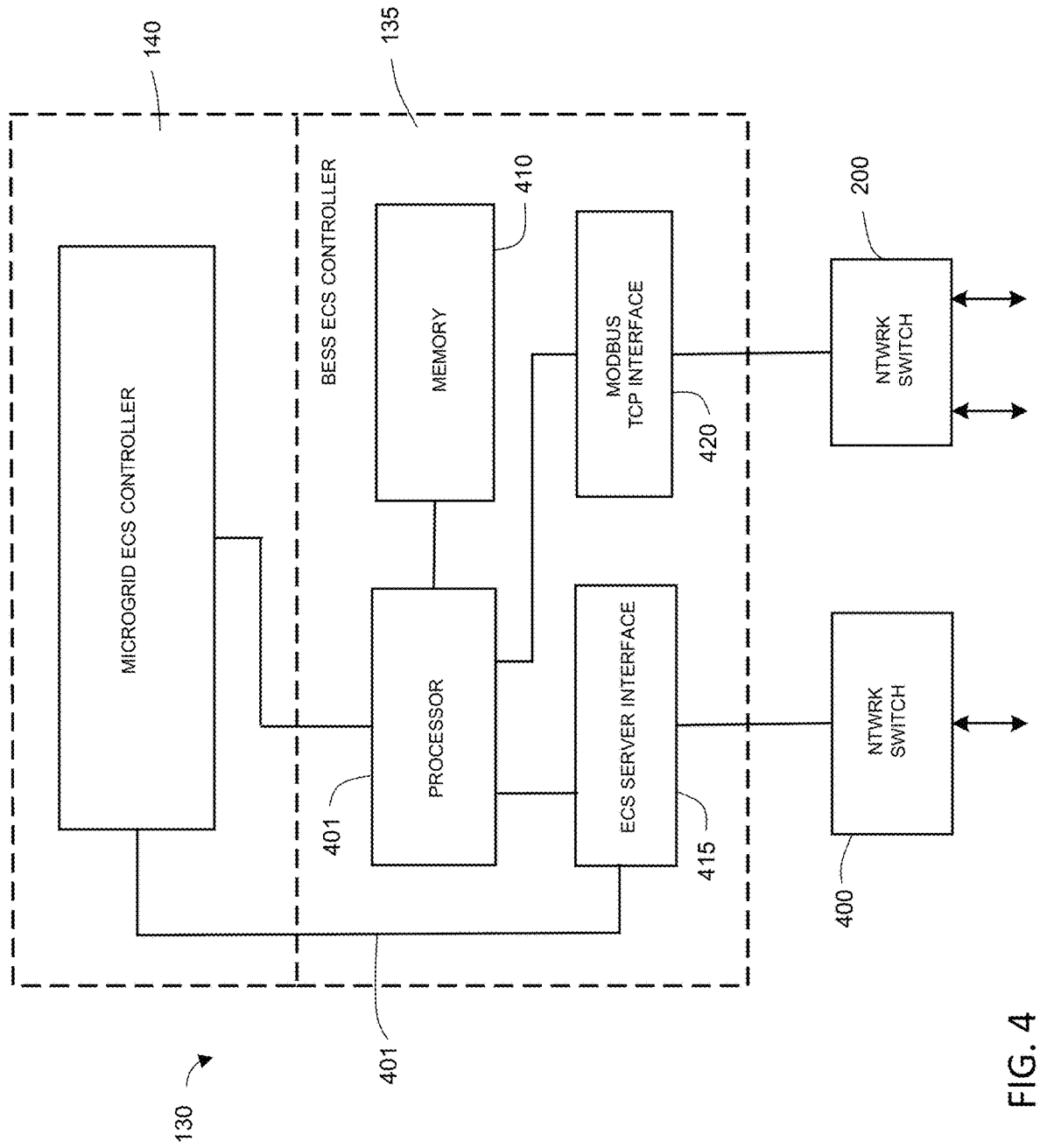
FIG. 4 is diagram schematically illustrating the electronic control system according to an exemplary embodiment of the present disclosure.

With reference to FIG. 4, the components of the ECS 130 are illustrated. The ECS 130 is comprised of the BESS ECS controller 135 and the MECS controller 140. The BESS ECS controller 135 and the MECS controller 140 are logically separate, however, they may be located on and execute within a common physical hardware/software controller or communicatively coupled to different physical hardware/software controllers. As shown in FIG. 4, the BESS ECS controller 135 is comprised of at least one processor 401, at least one memory device 410, at least one ECS server interface 415 and a least one MODBUS TCP interface 420. The processor 401 executes instructions that may be loaded into memory 410. The processor 401 may include any suitable number(s) and type(s) of processing or other devices in any suitable arrangement. Example types of processing devices include microprocessors, microcontrollers, digital signal processors, field programmable gate arrays, application specific integrated circuits, and discreet circuitry.

The memory 410 represents any structure(s) capable of storing and facilitating retrieval of information (such as data, program code, and/or other suitable information on a temporary or permanent basis). The memory 410 may represent a random access memory or any other suitable volatile or non-volatile storage device(s). The memory may also include one or more components or devices supporting longer-term storage of data, such as a ready only memory, hard drive, flash memory, or optical disc.

The processor 401 executes the various programs stored in memory 410 that operates the BESS ECS controller 135 to provide references for power balancing between BESS containers 120 and the PCS 315 attached to the BESS containers 120. The programs further operate to distribute the power balancing references to the BESS unit controllers 110. The BESS ECS controller 135 also takes inputs on the number of battery racks 305 that have been committed within a BESS container 120 in the calculation of power reference for the BESS containers 120. The BESS ECS controller 135 executes programs that calculate energy balancing taking into consideration the aggregate SOC and cycle count of different BESS containers 120 that have the same or a different number of battery racks 305 available for discharge or cut-out and not available for use.

The ECS server interface 415 provides a communication portal to network 108 through network switch 400 and firewall 220 to the VPP 160 using a DPN3 protocol. This communication portal from server interface 415 serves as the BESS container 120 connection to VPP 160 and level 4 of the BESS control system 100. As is seen in FIG. 4, the MECS controller 140 also includes a direct communication connection to the ECS server interface 415 through a bidirectional line 401 that allows the MECS controller 140 to have direct access to the VPP 160. The MECS controller 140 can be located and contained in the ECS 130, however, as explained above, it is logically separate from the BESS ECS controller 135.

The MODBUS TCP interface provides a Modbus TCP/IP communication portal providing Ethernet intranet communication between the BESS ECS controller 135 and BESS unit controllers 110 in either single or multiple BESS container 120 deployments using network switch 200.

The ECS 130 functions as an DNP3 outstation that interworks with a DNP3 master running on server 162 on the VPP 160. The BESS ECS controller 135 allows selection of four different operating modes to provide power reference for connected BESS unit controllers 110. These include: (1) a configurable power reference configured for a configurable duration of test (this mode is used mostly for test and certifications; (2) a local human machine interface (HMI) configuration of a schedule for charging or discharging according to a power reference configured to the BESS ECS controller 135, from for example, the operator station 164 or the handheld mobile device 240; (3) a local HMI configuration of use cases that the battery rack 305 needs to support and a configurable schedule for the use cases of the HMI configuration; and (4) a download of BESS charge/discharge schedule from a remote operation center from the cloud 168. Operating mode 3 enables operation of the BESS control system 100 within a microgrid, where function blocks running algorithms for each of the use cases generates a power reference for the PCS 315 to handle charging or discharging of the battery racks 305 contained in the BESS container 120.

As illustrated in FIG. 4, the VPP 160 is directly connected to the MECS controller 140 of each ECS 130. The VPP 160 performing centralized co-ordination of distributed microgrids. The VPP 160 is tasked to calculate reference power for either supplying power to the microgrid or drawing power from a main grid to which multiple microgrids are connected. The MECS controller 140 can also receive an operating schedule from the VPP 160. For example, a schedule for the exchange of power between a microgrid and the grid, or a schedule of grid electricity prices associated with power import or export in situations where the import and export of power has a difference in a price setpoint, or simply a schedule of use cases for which one or more BESS containers 120 along with generation assets and loads are to be committed. For example, renewable smoothing for export between 09:00 and 12:00 hours, and frequency regulation support between 12:00 and 17:00 hours and grid peak demand support between 17:00 and 20:00 hours.

With information from the VPP 160, the MECS controller 140 computes a schedule for charging or discharging one or more BESS containers 120. The MECS controller 140 computing the schedule for charging or discharging, taking into account, the schedule provided by the VPP 160, but also the local generation loads, frequency and voltage within a microgrid.

When computing schedules the MECS controller 140 uses look ahead operations, to forecast local power generation and demand/loads. When local power generation is controllable, such as for example using a diesel generator, the forecast of such generation is same as the schedule for commitment of controllable generators. When power generation is not controllable, and are variable and intermittent in nature, such as using renewable power generation sources, a forecast is computed using historic time series data as well as inputs from weather stations and other sources of weather forecast provided by the VPP 160. If there is a deviation, then the deviation needs to be accounted for and the schedules revised. For example, in a look ahead operation that uses a forecast, a short-term accurate forecast is necessary because charging or discharging a battery takes a finite amount of time and depends on the rate at which level the battery is providing energy or its C-Rating. For instance, it takes approximately 1 hour to fully charge a 1 C rated battery system while it takes 4 hours to fully charge or discharge a 0.25 C rated battery system. Hence for a 0.25 C rated battery system, in order to meet a grid peak support use case at any given time, battery charging should have started at least four hours before the time at which battery is intended to be discharged using PCS 315. Even for a 1 C rated system, where it is feasible to charge with high power, but charging with a higher power may attract higher demand charges, or alternatively may cause a larger rise in battery temperature that can cause it to degrade faster, it may be necessary to charge with a lower power. A lower charging power would mean charging for a longer duration and a forecast for at least that duration is necessary to ensure battery is charged when it is required to discharge the stored energy.

The VPP 160 is further tasked in the balancing of the supply and demand for power in multiple microgrids using economic optimization objectives, peak demand forecasts and renewable energy generation forecasts. For example, the VPP 160 may receive information from the cloud 168 from energy trading data that generates market bids and market clearing prices from an energy market operator. The information used on demand as information response signals to the MECS controller 140 to reduce use of diesel electrical generating sources over other generating sources due to the higher costs of diesel fuel.

The VPP 160 may execute standard equipment templates for all distributed energy resources that are managed within a microgrid. For every distributed energy resource managed by the VPP 160 a standard equipment template is maintained by the VPP 160 software. Each BESS ECS controller 135 maintains a library of object models in memory 410 for different types of distributed energy resources associated with a BESS unit container 120. For example, the BESS ECS controller 135 may contain a battery container object model for a BESS container 120, describing how the battery cells of a battery module are arranged, the number of battery modules stacked to form a battery rack 305, and the number of battery racks 305 installed within the BESS container 120.

The BESS ECS controller 135 may also contain a meter object model stored in memory 410 used for modeling banks of loads that are behind a multifunction meter. The BESS ECS controller 135 may also include an environment object model used for monitoring the environmental parameters, such as for example, temperature, pressure, relative humidity within a BESS unit container 120 and a safety system object model used for modeling safety critical safety parameters of a BESS container 120.

The BESS unit controller 110 has 2 operational modes:
1. A normal operation mode consisting of:
    1.1 a Grid Connected Mode;
    1.2 a Backup/Islanded Mode; and
2. an Engineering Mode, In operational modes 1 and 2 the BESS unit controller 110 can have up to eleven different operational states:
   a. a Startup State;
   b. a Ready State;
   c. a Charging State;
   d. a Discharging State;
   e. a Restricted Charge Only State;
   f. a Restricted Discharge Only State;
   g. a Long Term Shutdown State;
   h. a Selective Shutdown State;
   i. an ESTOP TRIP State;
   j. a FIRE TRIP State; and
   k. an Idle State.

In the Grid Connected Mode of operation the PCS 315 synchronizes to the grid frequency and follows the grid voltage. The voltage output is not determined by the PCS 315 but rather it follows the grid voltage. An inverter associated with PCS 315 sources current so that output power produced matches the power reference that is calculated by the BESS ECS controller 135 and provided to the PCS 315 via the BESS unit controller 110. In this mode of operation, the inverter can produce the same output power on all three phases and hence the loads on all three phases are balanced. Any imbalance would be resolved by power drawn from the grid or other generators for phases that have higher loads than the phase with a minimum load. If the power reference is negative, then the PCS 315 will charge the battery with power drawn from grid or an alternate source of power selected by the MCES controller 140. Charging power is calculated by the BESS ECS controller 135, taking into consideration the total generation within a microgrid to be served, total loads within the microgrid and constraints on power that can be drawn from the grid.

The Backup/Island mode of operation is entered when a grid failure is detected by BESS ECS controller 135. In this mode of operation, PCS 315 produces an AC output voltage and frequency that is determined by a PCS configuration for no load voltage and frequency by the BESS unit controller 135. This configuration of no load voltage and frequency may also be changed when the BESS unit controller 110 is commanded by BESS ECS controller 135 to change the voltage and frequency. The voltage output and frequency are determined by an inverter device associated with the PCS 315, not by any other generator that may be sharing a load with PCS 315. The inverter supports the microgrid voltage when in the Islanded Mode so that output power produced matches the power reference that is calculated by the ECS controller 135. In this mode of operation, the PCS 315 can produce a different output power on three phases of AC and the current on each phase depends on the loads connected to that phase. If the power reference is negative, then the PCS 315 will charge the battery 305 with power drawn from alternate sources selected by the BESS MCES 140. Charging power is calculated by BESS ECS controller 135, taking into consideration the total generation within a microgrid and total loads within the microgrid.

The Engineering Mode of operation is meant for use by maintenance engineers for the purpose of test, repair, and maintenance, including the replacement of faulty parts or subsystems, and to test the BESS container 120, and ECS 130 before putting the system back in normal operation. It can also be used during installation and commissioning of a BESS container 120. In the Engineering Mode of operation, the BESS unit controller 110 ignores power reference for the PCS 315 from the BESS ECS controller 135. Instead, it takes a fixed power reference for both active and reactive power that a user may configure using an HMI entered into the operator station 164 or the mobile device 240. The BESS container 120 may enter into restricted charging or discharging mode of operation only if load thresholds are reached.

The Startup State is the first state after the BESS unit controller 110 is powered on and the BESS unit controller 110 program is executed by the processor 310. Upon startup the connections to the various subsystems and components of the BESS container 120 are tested. Such as for example, HVAC-1, HVAC-2, LT switch gear 317, PCS 315, BAU 360, etc. If the connection tests fail, the system will wait for a configurable duration of time, before repeating the connection tests. If connection tests fail again the startup is aborted and system waits until the connection alarms are cleared.

The ready state is reached, if there are no connection errors to and from any of the BESS container 120 subsystems, and when an operator configures system to come up in normal operation mode, if there are no high alarms, such as for example, a hydrogen gas detector 366 failure or a battery temperature alarm from the BMS 310. In the ready state, the BESS unit controller 110 waits for command from the BESS ECS controller 135 to start the PCS 315 and the BMS 310.

The Charging State or the Discharging State is entered after the ready state is reached. The BESS ECS controller 135 or BESS unit controller 110 (in engineering mode) commands the PCS 315 to charge the battery 305 with a negative power reference. In the Discharge State the BESS ECS controller 135 or BESS unit controller 110 (in engineering mode) commands the PCS 315 to discharge the battery 305 with a positive power reference.

The BESS 100 enters the Restricted Charge Only State when battery 305 is deep discharged, and a low SOC limit is reached. Two low thresholds L1 and L2 (L1<L2) are configurable by the user using the HMI running on the operator station 164 or mobile device 240. The BESS unit controller 110 goes into the Restricted Charge Only State when the L1 threshold is reached and remains in this state until it charges up and the L2 threshold is reached. After the L2 threshold is reached, it comes back to either a normal or an engineering mode of operation and continues in that mode. A typical value for L1 is 20% of the battery rack 305 SOC and a typical value for L2 is 50% of the battery rack 305 SOC. The value of L1 should be higher than the SOC low threshold set by the BMS 310 so that BMS 310 does not go into the restricted mode of operation not under the control of BESS unit controller 110. These thresholds can be changed by a user using the HMI as described above. When the BESS unit controller 110 is in the Restricted Charge Only State, a positive power reference for the PCS 315 from ECS controller 135 is ignored by the BESS unit controller 110 and replaced with zero power reference. A negative power reference from BESS ECS controller 135 is passed to the PCS 315 for charging the battery 305.

The BESS unit controller 110 is in a Restricted Discharge Only State when the battery 305 is fully charged and a high SOC limit is reached. Two high thresholds H1 and H2 (H1>H2) are configurable from the HMI. The BESS unit controller 110 goes into the Restricted Discharge Only State when an H1 threshold is reached and remains in this state until it is discharges down to and reaches the H2 threshold. After the H2 threshold is reached, it comes back to either the normal or engineering mode of operation and continues in that mode. A typical value for H1 is 95% of the battery rack 305 SOC and a typical value for H2 is 50% of the battery rack 305 SOC. The value of H1 is set lower than the SOC high threshold for BMS 310 so that BMS 310 does not go into the restricted state of operation that is not under the control of BESS unit controller 110. When BESS is in the Restricted Discharge Only State, a negative power reference for the PCS 315 from the BESS ECS controller 135 is ignored by the BESS unit controller 110 and replaced with a zero power reference. A positive power reference from the BESS ECS controller 135 is passed to the PCS 315 for discharging the battery rack 305.

In the Standby State the BESS unit controller 110 will be in an idle state with zero power reference to the PCS 315 and disconnected from battery (DC side) and grid (AC side). In the Standby State PCS 315 is not modulating. The standby state is entered when alarms are low on a priority list, which do not require a complete shut-down of BESS container 120. The standby state can also be entered when continued charging or discharging of the battery 305 can lead to faults that may trigger higher priority alarms. When in the standby state, the PCS 315 can come out of the standby state and go to the Grid Connected Mode of operation when alarms are cleared in less than 10 seconds of their occurrence.

In the Graceful Shutdown State the BESS container 120 subsystems are shut down and the BESS unit controller 110 is halted. PCS 315 is disconnected from the battery 305. The Graceful Shutdown State is entered when high priority alarms are being sent from the BESS container 120 subsystems that are of high priority and which do not require a trip of BESS unit controller 110. Additionally, This state may be entered when continued operation of BESS unit controller 110 could lead to faults that may trigger higher priority alarms. All BESS container 120 subsystems including the HVAC-1, HVAC-2 subsystems are shut down. Examples of conditions that would trigger a Graceful Shutdown State of are when a pre-fire alarm is raised by the fire panel 362 or when the BESS unit container 120 internal RH sensor 358 raises an alarm. When in Graceful Shutdown state, the BESS unit controller 110 can only return to a normal operation mode by an operator intervention.

In the Long Term Shutdown State the BESS container 120 is shut down for a long duration. Battery 305 SOC should be within the specified range for long term shutdown. The long term storage charge for lithium batteries, is typically 30% of their SOC.

The Selective Shutdown option is used when individual subsystems are selectively shutdown, due to faults or for maintenance purpose.

In the ESTOP Trip State the BESS container 120 subsystems will disconnected from the grid and the battery 305 and program execution by the BESS unit controller 110 will halt. The PCS 315 is also disconnected from battery 305 and ceases to modulate. The ESTOP Trip State is entered when high priority alarms are encountered, that do not allow time for a graceful shut down of the BESS container 120 subsystems, and when continued operation of the BESS container 120 can lead to damages to BESS control system 100. HVAC-1 and HVAC-2 systems are also turned off in the ESTOP Trip State. The ESTOP Trip State may be triggered when for example, the BAU 360 trips and is disconnected from PCS 315 or when an internal temperature alarm is raised when the BESS container 120 experiences a thermal run away. The BESS container 120 can be reset to a normal operation only on an operator intervention.

In Fire Trip state the BESS container 120 is disconnected from the grid and the battery 305 and execution of the BESS unit controller 110 will halt. The PCS 315 is disconnected from the battery 305 and the PCS 315 ceases to modulate. The Fire Trip State is entered when fire alarms are encountered, which do not allow time for a graceful shut down of the BESS container 120 subsystems, and when continued operation of BESS container 120 and HVAC-1 and HVAC-2 can cause safety hazards for fire-fighting personnel. HVAC-1 and HVCA-2 and auxiliary power supplies are taken off-line and the entire BESS container 120 including the BESS unit controller 110 and BESS ECS controller 135 are shut-down. The BESS container 120 can only be reset to a normal operation only on an operator intervention.

In the Idle State the BESS ECS controller 135 or the BESS unit controller 110 (in engineering mode) commands the PCS 315 to neither charge nor discharge the battery 305 by sending a zero power reference command.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," or "controller" within a claim is understood and intended to refer to structures known to those skilled in the relevant art, as further modified or enhanced by the features of the claims themselves and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A battery energy storage system for receiving energy from an electrical grid and for supplying electrical energy to one or more microgrids, the battery energy storage system comprising:
a virtual power plant system that receives an information concerning an electrical energy generation and an alternate sources of power asset available on the electrical grid;
a plurality of containers, wherein the container comprises:
a battery associated with the container; and
a power conversion system arranged to charge the battery with the energy from the electrical grid and discharge the battery to supply electrical energy to one or more microgrids, wherein the power conversion system comprises of:
an energy control system controller communicatively coupled to the power conversion system for managing the energy drawn from the electrical grid to charge the battery and manage the energy discharged from the battery to supply electrical energy to the one or more microgrids,
a container unit controller that is communicatively coupled to the energy control system controller and configured to control one or more functions of the power conversion system and the battery, wherein the energy control system controller uses an alternate power asset to charge the battery; and
a microgrid energy control system controller communicatively coupled to the virtual power plant system and the energy control system controller, wherein the virtual power plant system provides information of the alternate power asset available on the electrical grid to the microgrid energy control system controller and the microgrid energy control system controller is arranged to provide the information to the energy control system controller of the alternate power asset available on the electrical grid.

2. The battery energy storage system of claim 1, wherein the battery energy storage system further includes:
a container associated with the battery and the power conversion system, the container containing the container unit controller communicatively coupled to the battery and the power conversion system and to the energy control system controller; and
the container unit controller communicating a status information from the battery and the power conversion system to the energy control system controller and arranged to receive instructions from the energy control system controller to operate the power conversion system to charge or discharge the battery.

3. The battery energy storage system of claim 1, wherein the energy control system controller considers an amount of power required to be supplied to the electrical grid and is arranged to instruct the container unit controller of the container to discharge the battery so as to not over-discharge the battery.

4. The battery energy storage system of claim 3, wherein the energy control system controller considers the amount of power available on the electrical grid and instructs the container unit controller to charge the battery so as to not overcharge the battery.

5. The battery energy storage system of claim 1, wherein the virtual power plant system includes:
a communication network connected to the virtual power plant system and the microgrid energy control system controller;
a server connected to the communication network, the server executing a virtual power plant controller;
an operator station connected to the communication network for entering and receiving information from the communication network; and
an interface to a cloud for receiving information from an internet.

6. The battery energy storage system of claim 1, wherein the container includes a wireless interface connected to the energy control system controller and the container unit controller.

7. The battery energy storage system of claim 6, wherein the wireless interface is arranged to send signals to a handheld mobile device.

8. The battery energy storage system of claim 6, wherein the container unit controller monitors an operation of the battery and the power conversion system of the container and prevents operation during fault conditions, shutting down the power conversion system and sending alarms on a communication network to an operator station or the wireless interface to an handheld mobile device.

9. An apparatus for receiving energy from an electrical grid and for supplying electrical energy to one or more microgrids, the apparatus comprising:
an energy control system processor,
an energy control system memory coupled to the energy control system processor;
a virtual power plant system that receives an information concerning an electrical energy generation and an alternate sources of power assets available on the electrical grid;
a plurality of containers, wherein the container comprises:
a battery associated with the container; and
a power conversion system, arranged to charge the battery with the energy from the electrical grid and discharge the battery to supply electrical energy to one or more microgrids, wherein the power conversion system comprises of:
an energy control system controller stored in the energy control system memory and executed by the energy control system processor for managing the energy drawn from the electrical grid to charge the battery and manage the energy discharged from the battery to supply electrical energy to the one or more microgrids,
a container unit controller that is communicatively coupled to the energy control system controller and configured to control one or more functions of the power conversion system and the battery associated with the container, wherein the energy control system controller uses the alternate power asset to charge the battery; and
a microgrid energy control system controller communicatively coupled to the virtual power plant system and the energy control system controller, wherein the virtual power plant system provides information for the alternate power asset available on the electrical grid to the microgrid energy control system controller and the microgrid energy control system controller is arranged to provide the information to the energy control system controller of the alternate power asset available on the electrical grid.

10. The apparatus of claim 9, wherein: the apparatus further includes:
   a container associated with the battery and the power conversion system,
   a container unit processor;
   a container unit memory coupled to the processor;
   the processor communicatively coupled to the battery and the power conversion system and to the energy control system controller; and
   the container unit controller stored in the container unit memory and executed by the container unit processor that communicates status information from the battery and the power conversion system to the energy control system controller and arranged to receive instructions from the energy control system controller to operate the power conversion system to charge or discharge the battery.

11. The apparatus of claim 10, wherein the container unit processor executing the container unit controller to communicatively couple to the battery and the power conversion system associated with the container of the plurality of containers and to the energy control system controller,
   the container unit controller communicating status information from the battery and the power conversion system associated with the container to the energy control system controller and arranged to receive instructions from the energy control system controller to operate the power conversion system to charge or discharge the battery.

12. The apparatus of claim 11, wherein the energy control system controller is executed by the energy control system processor to consider an amount of power required to be supplied to the electrical grid and arranged to instruct the container unit controller of the container to discharge the battery so as to not over-discharge any one of the battery.

13. The apparatus of claim 11, wherein the energy control system controller is executed by the processor to consider an amount of power available on the electrical grid and arranged to instruct the unit controller of the container to charge the battery so as to not over-charge any one of the battery.

14. The apparatus of claim 11, wherein the apparatus further includes:
   a communication network connected to the virtual power plant system and the microgrid energy control system controller;
   a server connected to the communication network, the server executing a virtual power plant controller;
   an operator station connected to the communication network for entering and receiving information from the communication network; and
   an interface to a cloud for receiving the information from an internet.

15. The apparatus claim 14, wherein the container includes a wireless interface connected to the energy control system controller and the container unit controller.

16. The apparatus of claim 15, wherein the wireless interface is arranged to send signals to a handheld mobile device.

17. The apparatus of claim 16, wherein the container unit controller is operated by the container unit processor to monitor the operation of the battery and the power conversion system of the container and prevent operations during fault conditions, shutting down the power conversion system and sending alarms on the communication network to the operator station or the wireless interface to the handheld mobile device.

\* \* \* \* \*